United States Patent
Burdack et al.

[11] Patent Number: 5,887,892
[45] Date of Patent: Mar. 30, 1999

[54] AIRBAG COVER WITH HORN FOILS

[75] Inventors: Harald Burdack, Haibach; Manfred Zerbe, Aschaffenburg, both of Germany

[73] Assignee: Petri AG, Aschaffenburg, Germany

[21] Appl. No.: 823,369

[22] Filed: Mar. 24, 1997

[30] Foreign Application Priority Data

Mar. 28, 1996 [DE] Germany .................. 296 06 322 U

[51] Int. Cl.$^6$ .................................................. B60R 21/16
[52] U.S. Cl. ...................................... 280/731; 280/728.3
[58] Field of Search ............................... 280/731, 728.3

[56] References Cited

U.S. PATENT DOCUMENTS

| | | | |
|---|---|---|---|
| 5,085,462 | 2/1992 | Gualtier | 280/731 |
| 5,338,059 | 8/1994 | Inoue et al. | 280/728.3 |
| 5,463,258 | 10/1995 | Filion et al. | 307/10.1 |
| 5,520,412 | 5/1996 | Davis | 280/728.3 |
| 5,577,766 | 11/1996 | Niwa et al. | 280/731 |
| 5,588,673 | 12/1996 | Green et al. | 280/731 |

*Primary Examiner*—Kenneth R. Rice
*Attorney, Agent, or Firm*—Christie, Parker & Hale, LLP

[57] ABSTRACT

An airbag module cover an airbag module housing. The cover has two electrically conducting foils which are spaced apart opposite each other between a front panel and a back panel. The distance between the foils is guaranteed by nonconducting spacers which are disposed between the foils. A stop member is connected to the back panel. A gas diffuser is disposed inside the airbag module housing. A space is defined between the diffuser and the stop member. A layer of a folded airbag penetrates the space. When pressed, the cover deflects causing the stop member to travel through the space contacting the folded airbag and stopping against the diffuser. A resulting pressure causes the foils to make contact and activate the horn.

12 Claims, 4 Drawing Sheets

AIRBAG COVER WITH HORN FOILS

BACKGROUND OF THE INVENTION

The invention relates to an airbag module having a cover having horn foils located between a front and a back panel.

An airbag is typically housed in an airbag module. The airbag module has a cover and a housing. The cover has a front panel, at least a portion of which is elastically deformable, and a back panel. The back panel is preferably flexible. Front and back horn foils are located between the cover front and back panels. When the cover is on the housing, the back panel is located opposite the folded airbag.

To activate a car horn, the foils must make contact. This is typically accomplished by depressing the front panel toward the back panel. As the front panel is depressed is causes the cover to depress until it makes contact with the airbag. Such contact causes the front panel to compress against the back panel, thereby, causing the foils to make contact, activating the horn. For problem-free activation of the horn, a defined space must exist between the back panel of the airbag module cover and an airbag in the airbag module. If this space is too small, the airbag may press against the cover back panel and move it toward the front panel causing the foils to move closer to each other. In this regard, the slightest force against the front or back panels of the cover may cause the horn foils to make contact and accidentally trigger the horn. If the space between the back panel and the folded airbag is too great, the cover must be depressed deeply to obtain contact between the foils. In this regard, the forces required to activate the horn may be high and inconsistent.

In practice, an attempt has been made to eliminate these disadvantages through optimization of the folding of the airbag to consistently obtain a free space in the airbag module. However, because of the unavoidable tolerances of the airbag and the folding of the airbag, a consistent free space is difficult to obtain.

SUMMARY OF THE INVENTION

The object of the invention is to enable activation of the horn with slight force while at the same time reducing the risk of accidental horn activation. To accomplish this, the invention provides for an airbag module having a housing which is covered by a cover. The covering has a front and a back panel and horn foils therebetween. A stop member is coupled to the back panel and is positioned opposite a barrier which is also disposed in the housing. A folded airbag is disposed between the stop member and the barrier.

In a preferred embodiment, a preferably rigid stop member is provided between the back panel and a diffuser in the airbag module, whereby when the airbag is in a folded state inside the module, the folds of the airbag lie near the diffuser, at a distance from the airbag module cover, and only one layer of the airbag lies between the stop member and the diffuser. The diffuser represents a defined stop for the stop member. The stop member is connected to the back panel. A free space is provided between the stop member and the gas diffuser. When the airbag module cover is depressed, the stop member pushes on the folded airbag to make contact with the diffuser causing the front cover panel to compress against the back panel causing the horn foils to come in contact, thereby activating the horn. The stop member is designed such that a certain minimum deflection of the front foil is necessary to trigger the horn. The free space between the stop member and the diffuser has sufficient depth so as to prevent any accidental activation of the horn due to variations in the airbag thickness.

Preferably, the stop member is attached or is integral to the back panel at a plurality of points. The stop member causes the airbag to contact a point or an area on the diffuser.

Preferably, the stop member is composed of strips arranged in a star-shaped pattern, the ends of which are attached or are integral to the back panel. In another embodiment, the stop member is a membrane. In another embodiment, an elastically deformable stop member is used.

DETAILED DESCRIPTION

Figure 1:
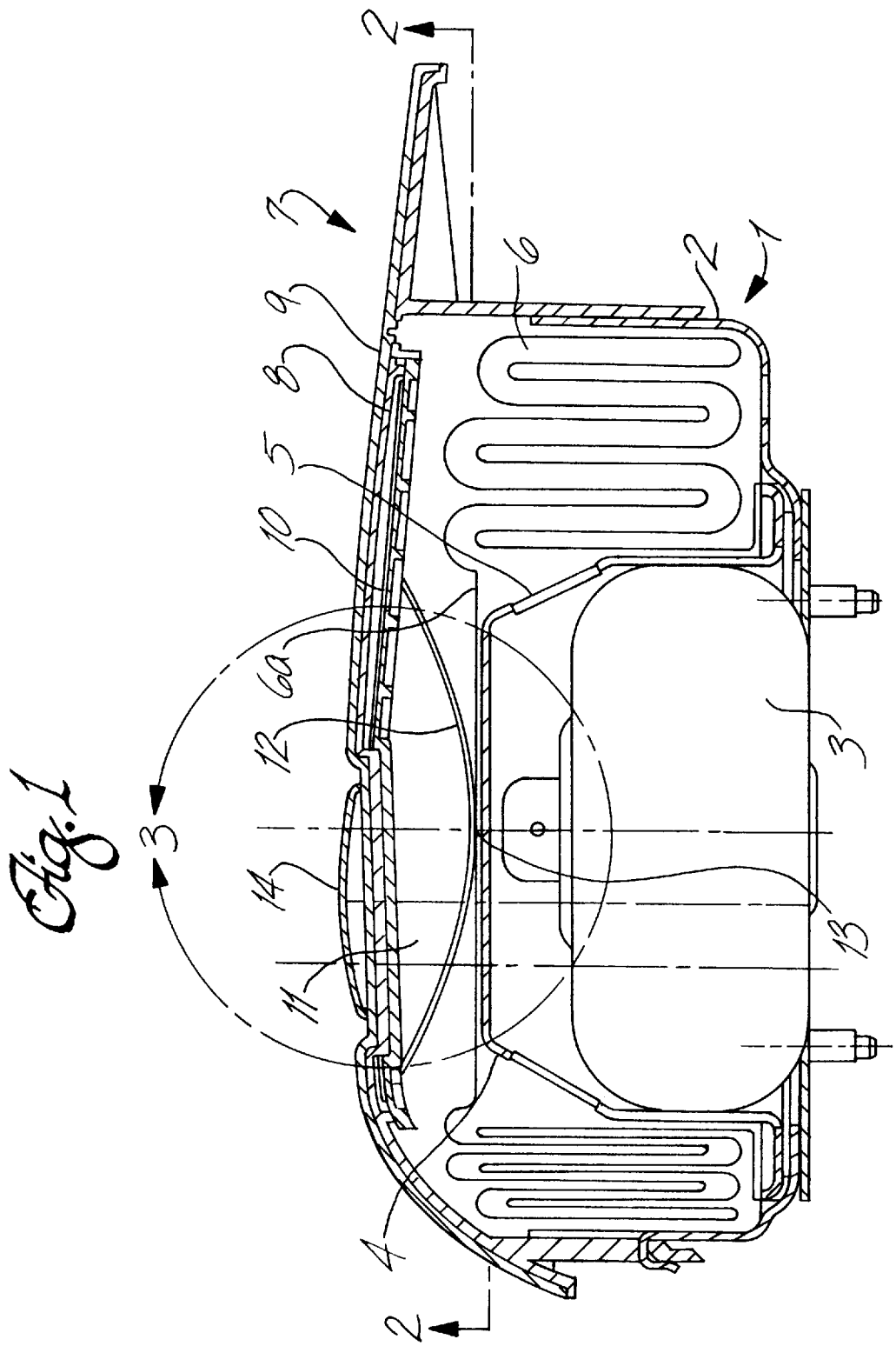
FIG. 1 shows a cross-section of an airbag module.

An airbag module 1 has a housing 2 in which are disposed a gas generator 3 with a diffuser 4 attached over the generator (FIG. 1). The diffuser has outlets 5 for the release of the generator gases into an airbag 6. The airbag is folded in layers such that the folds are adjacent the gas generator and that only one individual layer 6a of the airbag lies in front of the diffuser 4.

Figure 3:
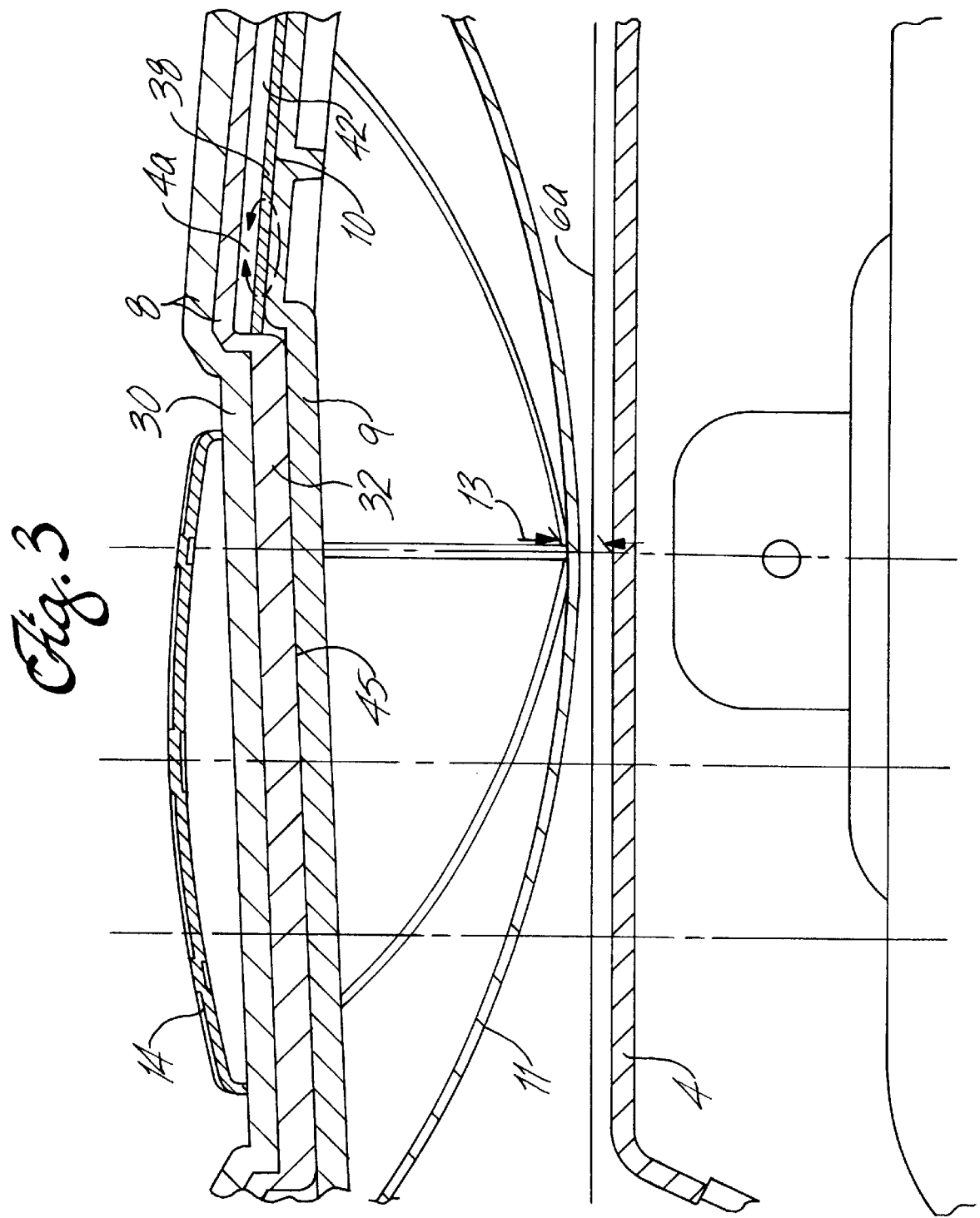
FIG. 3 is an enlarged cross-sectional view showing the relationship between the front and back panels and the horn foil assembly.
Figure 4A:
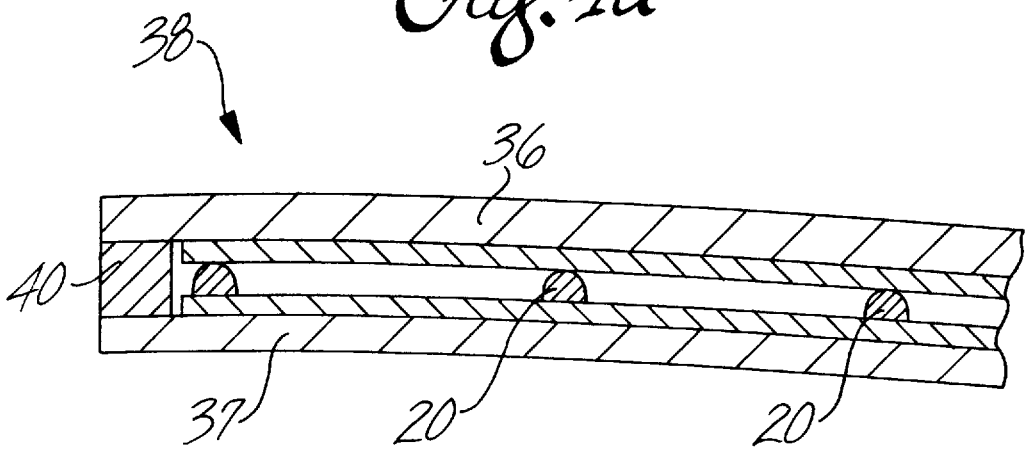
FIG. 4a is a cross-sectional view of the horn foil assembly.

The airbag module further has a cover 7 which consists of a front panel 8 and a back panel 9. The front panel may consist of two layers 30, 32 (FIG. 3). The cover forms the front face of the airbag module. Horn foils 10 for activating the horn when in contact with each other are disposed between the two panels, in known fashion, at a distance from each other (FIG. 4). A portion 45 of the front panel is in contact with the back panel. Typically, these foils are separated from each other by spacers 20 spaced at intervals between the inner surfaces of the foils. The two spaced apart foils are sandwiched between a front 36 preferably flexible layer 36 and a back layer 37 which can also be flexible, forming a horn foil assembly 38. The flexible layers are preferably made from polyethylene. The flexible layers extend beyond the foils. Spacers 40 are located between the flexible layer portion extending beyond the foils. These spacers keep the panels spaced apart so as to not accidentally cause the foils to contact the other.

The horn foil assembly rests with its back layer 37 against the back panel 9. The back layer may be adhered to the back panel. A space 42 is formed between the front panel 8 and the horn assembly front layer 36.

A stop member 11 according to the invention is provided between the back panel 9 and the diffuser 4. This stop member preferably consists of strips running in a star-shaped pattern with each other (FIGS. 2 and 3), the ends of which are connected to or are integral with the back panel 9. The strips are bowed between their ends forming arcs. In other embodiments, the stop member may be a membrane, a shell, or a solid, preferably in the shape of a spherical section. The stop member is preferably rigid but may also be made from a ductile material. The stop member may be adhered to the back panel or may be integrally formed with the back panel. A space 13 lies between the stop member 11 and the diffuser 4. A badge 14 may be provided on the cover 8, typical over the area in which the front panel directly contacts the rear panel. Deviations in the thickness of the airbag material causes changes in the volume of space 13 that remains free. These changes, however, are of secondary importance.

Figure 4B:
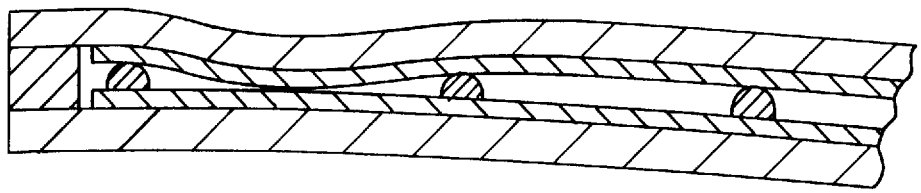
FIG. 4b is a cross-sectional view of the horn foil assembly depicted in FIG. 4a with the horn foils making contact.

To activate the horn, the front panel is pressed preferably in an area outside the badge. As the front panel is pressed, it flexes in the free space 42. Simultaneously, the front panel exerts a force on the back panel through the area in which front panel directly contacts the back panel. As a result, the back panel also deflects causing the stop member to make contact with the airbag and push the airbag against the diffuser. The diffuser acts as a barrier, stopping the travel of the stop member. At this point, the back panel rate of deflection is curtailed or even stopped, causing the front panel to make contact with and compress the foil assembly front layer against the back layer which causes the front foil to contact the back foil and activate the horn as shown in FIG. 4b.

Figure 2:
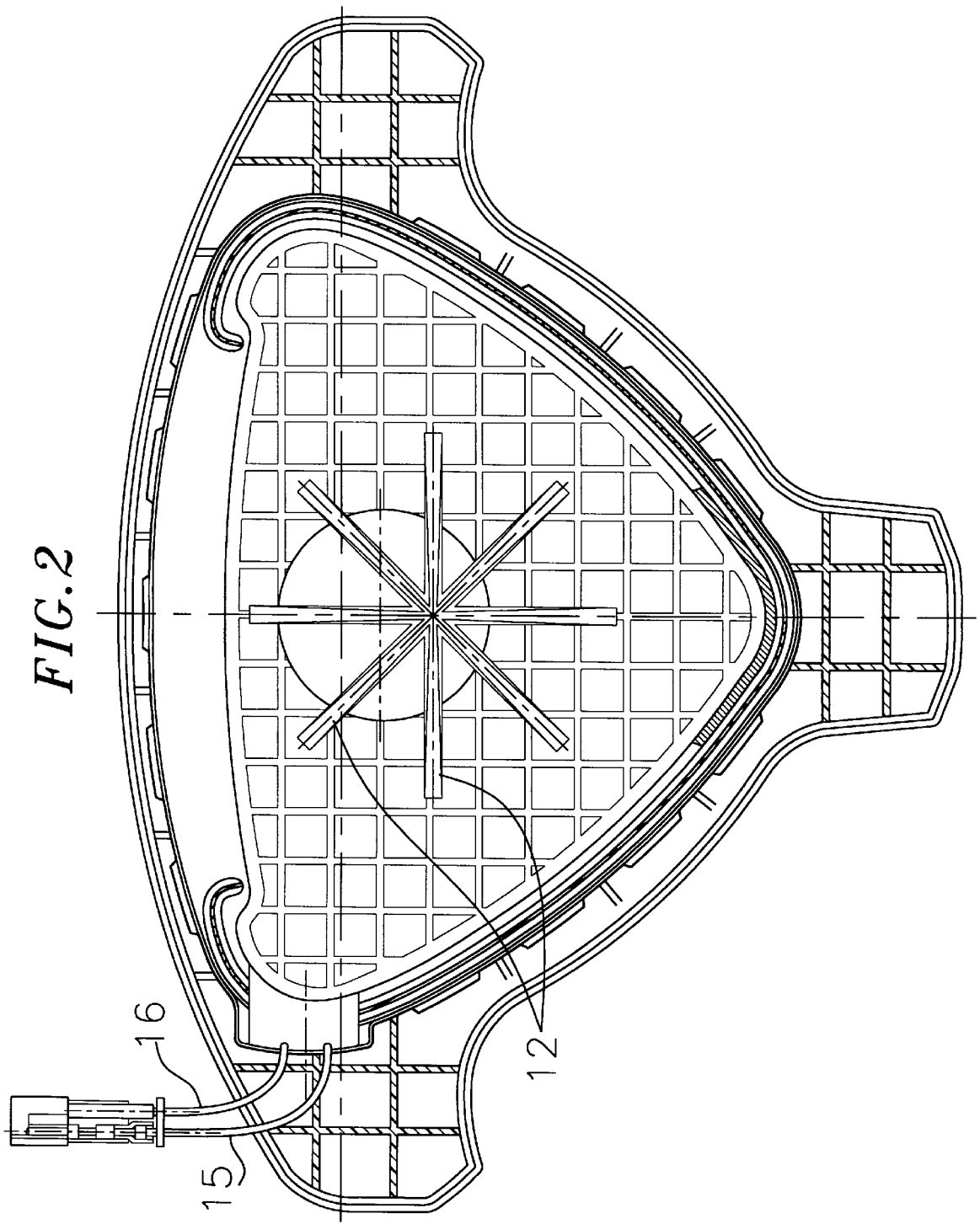
FIG. 2 is a bottom view of the airbag cover.

FIG. 2 depicts, in addition to the star-shaped arrangement of the strips 12, the electrical connections 15, 16 of the horn foils.

As it would become apparent to one skilled in the art, the front cover must be more flexible than the stop member. In this regard, when the stop member makes contact with the folded airbag against the diffuser, the rate of deflection of the front cover is greater than the rate of compression of the stop member so as to allow the cover front panel to make contact with the horn foil assembly for compressing the foils together. In another embodiment, the flexibility of the front panel in relation of the flexibility of the back panel is such that upon being pressed, the front panel causes the foils to contact each other and activate the horn just prior to the contact between the diffuser and the folded airbag being pressed by the stop member.

The disclosure of attached German application 296 06 322.3, filed on Mar. 28, 1996 is incorporated fully herein by reference. Priority of this German application is claimed.

Having now described the invention as required by the patent statutes, those skilled in the art will recognize modifications and substitutions to the elements of the embodiments disclosed herein.

What is claimed is:

1. An airbag module comprising:

a housing;

a cover for covering the housing, the cover having a front panel at least a part of which is elastically deformable and a back panel and horn foils therebetween, wherein the back panel is on the inside of the module;

a stop member coupled to the back panel;

a barrier disposed in the housing opposite the stop member; and a folded airbag disposed between the barrier and the stop member.

2. The airbag module according to claim 1 wherein a space is formed between the stop member and the barrier wherein upon depression of a section of the front panel, the stop member moves into the space.

3. The airbag module according to claim 2 wherein a portion of the airbag is disposed in the space.

4. The airbag module according to claim 2 wherein the airbag is folded in layers and wherein only one folded layer is disposed in the space.

5. The airbag module according to claim 2 wherein the barrier is a gas diffuser for diffusing gases for deploying the airbag.

6. The airbag module according to claim 5 wherein upon depression of a section of the front panel the stop member presses against the folded airbag and an area on the diffuser.

7. The airbag module according to claim 1 wherein the stop member is connected to the back panel at a plurality of points.

8. The airbag module according to claim 1 wherein the front and back panels contact each other over an area, the module further comprising a badge coupled to an area on the front panel which is within the area of contact between and front and back panels.

9. The airbag module according to claim 1 wherein the stop member comprises a plurality of strips arranged to form a star pattern, the strips having ends which contact the back panel.

10. The airbag module according to claim 1 wherein the stop member is a membrane.

11. The airbag module according to claim 1 wherein the stop member is integral with the back panel.

12. An airbag module comprising:

a housing;

a cover mounted on the housing, the cover comprising at least a partially elastic deformable front panel and a back panel having horn foils therebetween;

a folded airbag at least portion thereof being supported opposite the back panel; and a stop member in contact with the back panel and spaced from the housing.

* * * * *